United States Patent [19]

Grubert et al.

[11] Patent Number: 4,852,637

[45] Date of Patent: Aug. 1, 1989

[54] THERMOSTATIC CONTROLLED SYSTEM

[75] Inventors: Gordon R. Grubert, Westfield, Mass.; Douglas L. Christians, Vernon, Conn.

[73] Assignee: United Technologies Corporation, Hartford, Conn.

[21] Appl. No.: 201,231

[22] Filed: Jun. 2, 1988

[51] Int. Cl.$^4$ .............................................. B60H 1/00
[52] U.S. Cl. ...................................... 165/40; 165/16; 236/38; 236/49.3
[58] Field of Search ............... 236/49 B, 38, 35, 35.2; 165/16, 40, 122

[56] References Cited

U.S. PATENT DOCUMENTS

| | | | |
|---|---|---|---|
| 2,815,642 | 12/1957 | Sherwood | 60/23 |
| 3,445,317 | 5/1969 | Marshall et al. | 165/39 |
| 3,653,590 | 4/1972 | Elsea | 236/49 D |
| 3,682,831 | 8/1972 | Eckman et al. | 236/49 D X |
| 3,684,170 | 8/1972 | Roof | 236/49 D X |
| 4,108,238 | 8/1978 | Vary et al. | 165/57 |
| 4,250,709 | 2/1981 | Conrad et al. | 60/527 |
| 4,466,480 | 8/1984 | Ito et al. | 165/12 |
| 4,502,627 | 3/1985 | Ty | 236/93 |
| 4,503,675 | 3/1985 | Gardner et al. | 60/527 |
| 4,557,419 | 12/1985 | Hall, II | 236/93 |
| 4,580,620 | 4/1986 | Fukumoto et al. | 165/12 |
| 4,611,756 | 9/1986 | Ohashi | 236/49 |
| 4,691,516 | 9/1987 | Fornasari | 60/527 |

*Primary Examiner*—William E. Tapolcai
*Attorney, Agent, or Firm*—Lloyd D. Doigan

[57] ABSTRACT

An air supply and conditioning system 10 is provided having a constant speed air blower 26 whose output is controlled by a thermostatic throttle and check valve 28. The throttle and check valve provides a minimum air flow below a minimum ambient temperature, provides a maximum air flow above a maximum temperature, and provides a roughly linearly increasing flow from the minimum to the maximum ambient temperature. The air blower draws air through a pair of nuclear and biological contamination filters 22 from the ambient and impels the air through an air conditioning portion 14 and a pressurization door 42.

24 Claims, 2 Drawing Sheets

THERMOSTATIC CONTROLLED SYSTEM

TECHNICAL FIELD

This invention relates to an air conditioning system for an enclosed environment, and more particularly to a system which incorporates a thermostatically controlled throttle and check valve.

BACKGROUND ART

Some enclosed environments, such as the passenger compartment of a reconnaissance vehicle, require filtered and conditioned air for the comfort and safety of the compartment inhabitants. Such a vehicle is typically provided with an air supply and conditioning system. The air supply and conditioning system filters, pressurizes, and regulates the temperature of the air. The air is pressurized above ambient pressure to protect the compartment inhabitants by ensuring that any air leakages flow from the compartment. The system may be equipped with a blower to provide air for respiration when the power supply (and the air supply and conditioning system thereby) of the vehicle is shut down.

Generally, the air provided to the enclosed environment is supplied at a desired temperature. Some air supply and conditioning systems, however, have limited power to provide the air at the proper temperature. In cold environments, a system may not have enough energy to sufficiently heat the air provided to the enclosed environment. In warmer environments, a system may not provide enough air flow to properly cool the enclosed environment.

DISCLOSURE OF THE INVENTION

It is an object of the invention to provide a system for supplying air to an enclosed environment at a desired temperature while encountering both warm and cold ambient temperatures.

It is a further object of the invention to provide air to an enclosed environment while encountering lower ambient temperatures without exceeding the power capabilities of the system.

It is a further object of the invention to provide the proper amount of air flow to an enclosed environment while encountering higher ambient temperatures.

It is a further object of the invention to provide air to the enclosed environment with maximum reliability and simplicity and at a minimum cost.

According to the invention, an air supply and conditioning system is provided having an constant speed air blower whose output is controlled by a thermostatically controlled throttle and check valve, the throttle and check valve providing a minimum air flow below a minimum ambient temperature, and providing a maximum air flow above a maximum temperature. The air blower draws air through a pair of nuclear and biological contamination filters from the ambient and impels the air through an air conditioning system and a pressurization door.

According to a feature of the invention the throttle and check valve provides a roughly linearly increasing flow while the ambient temperature increases from the minimum to the maximum.

According to a feature of the invention, the throttle and check valve is normally biased closed to prevent air from escaping through the air blower when the air blower is inoperative.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
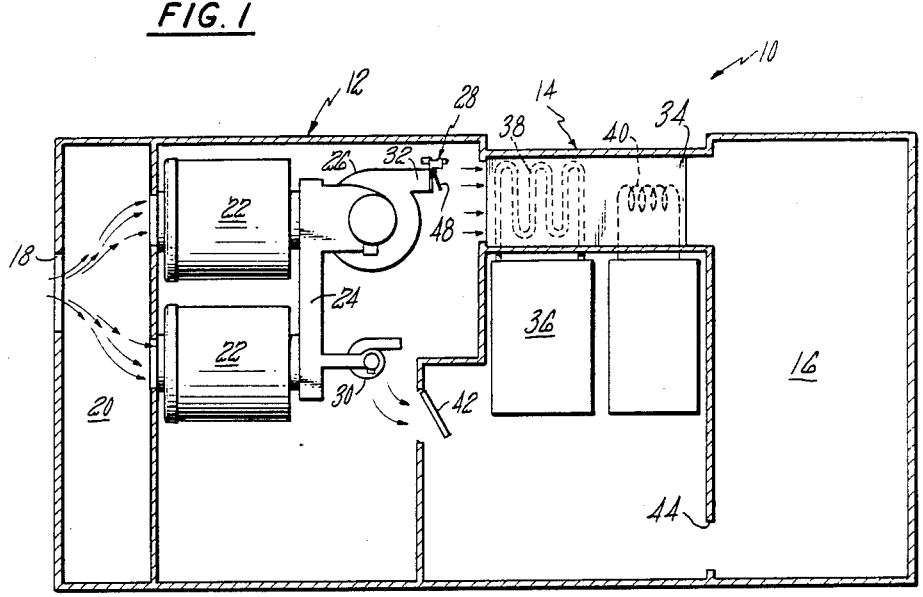
FIG. 1 is a schematic view of an embodiment of an air supply system incorporating a throttle and check valve.

Referring to FIG. 1, an embodiment of the thermostatic control system 10 of the invention is shown. Such a system is designed for use in reconnaissance vehicle but may have application for any enclosed environment. The system is characterized by an air intake portion 12, an air conditioning portion 14, and an enclosed environment 16.

The air intake portion 12 is comprised of an inlet 18, a first manifold 20, a pair of standard nuclear biological contamination (NBC) filters 22, a second manifold 24, a constant speed first blower 26, said first blower incorporating a thermostatically controlled throttle and check valve 28 for controlling the flow therefrom as will be discussed infra, and a second blower 30. The throttle and check valve 28 is disposed upon a roughly square outlet 32 of the first blower. The filters are sealingly mounted between the first and second manifolds, as is well known in the art, so that the air flows through the filters without leakage.

The air conditioning portion 14 comprises, a conduit 34, an air cooler 36 (shown schematically) having cooling coils 38 disposed within the conduit, and a plurality of electrical heating coils 40 disposed within the conduit downstream of the cooling coils. The electrical heating coils have a limited ability to heat the air passing thereby. A door 42, which may be biassed to an open or closed position, connects the air conditioning portion and air intake portion. The conduit may connect to garments (not shown) worn by the vehicle inhabitants to provide conditioned and filtered air directly thereto. A port 44 is provided between the air conditioning portion 14 and the enclosed environment 16.

Figure 3:
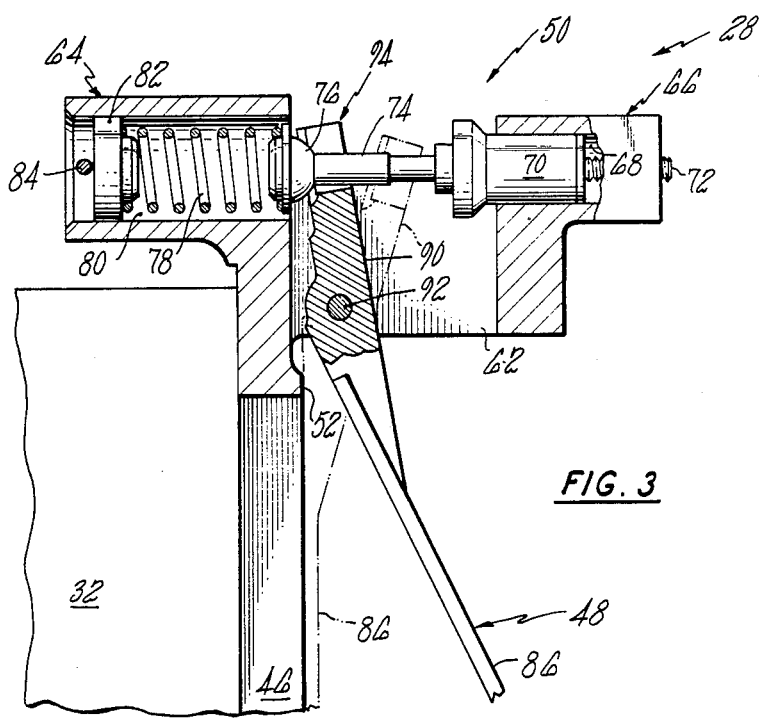
FIG. 3 is a view of the throttle and check valve of FIG. 2 taken along the line 3—3.
Figure 2:
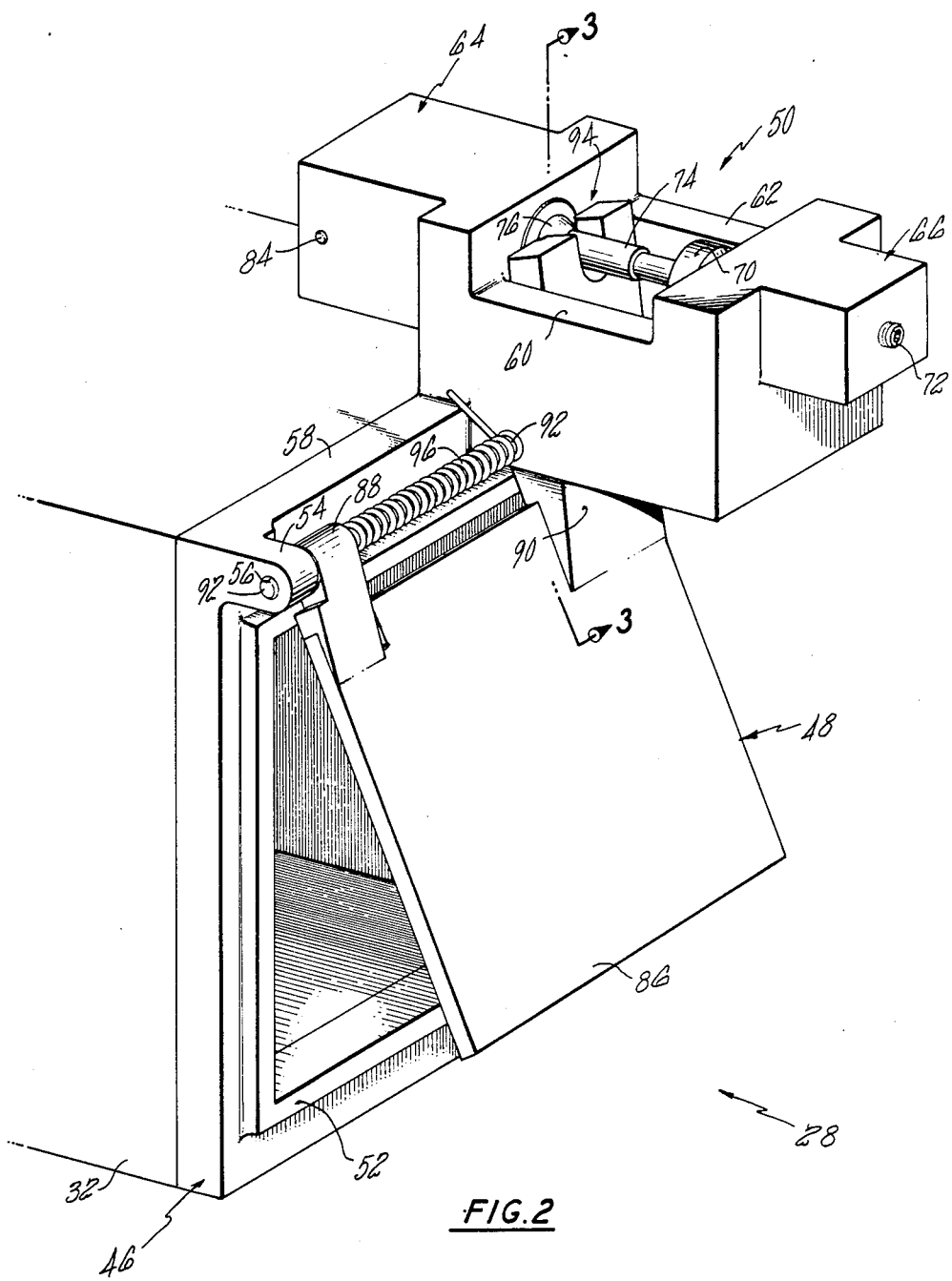
FIG. 2 is a perspective view of the throttle and check valve of FIG. 1.

Referring to FIGS. 2-3, the throttle and check valve 28 of FIG. 1 is shown. The throttle and check valve is comprised of a housing 46, a flapper 48 and an actuator section 50.

Referring to FIG. 2, the housing 46, which has a roughly rectangular shape, is appended to the outlet 32 of the blower by screws or the like (not shown). The housing has a raised portion 52 which approximates the shape of the flapper 48 as will be discussed infra. A bracket 54 having a hole 56 extends from an upper portion 58 of the housing. The actuator section 50 also extends from the upper portion of the housing.

The actuator section 50 has a pair of side plates 60, 62 attaching to the upper potion 58 of the housing 46. The side plates connect a spring support 64 and a thermoactuator support 66. Each side plate has an aperture (not shown, but see FIG. 3) that is coaxially aligned with the hole 56 in the bracket 54. Referring to FIG. 3, the thermoactuator support is shown having an cylindrical opening 68 for holding a thermoactuator 70. A screw 72 is threadably mounted to the thermoactuator support to adjust the position of the thermoactuator. The thermoactuator, which is a standard, self-contained, wax-based actuator manufactured by Standard Thompson of Waltham, Mass., is adapted to drive a piston 74 to the left as temperature rises. A semi-spherical stop 76 is appended to the piston. A spring 78, which urges the piston and the semi-spherical stop to the right as temperature falls, is disposed within a cylindrical opening 80 within the spring support. The spring is anchored in the spring support by a seat 82 and a retaining pin 84.

The flapper 48 has a flat portion 86 that covers the raised portion of the housing. A first arm 88 and a second arm 90 extend upwardly from the flat portion 86. Each of the first and second arms has a coaxial opening (see FIGS. 2 and 3) extending therethrough. An axle 92 extends through the hole 56 of the bracket 54, the opening in each of the first and second arms of the flapper, and the aperture in each of the side plates to pivotally mount the flapper such that the flat portion 86 closes securely about the raised portion 52 of the housing. The second arm 90 of the flapper extends between the side plates 60, 62 and is notched to form a yoke 94 about the piston 74. A torsion spring 96 is wrapped about the axle 92 to urge the flapper 48 against the raised portion of the housing.

In operation, the first blower 26 draws air from the ambient through the inlet 18 into the first manifold 20, and then through the filters 22 into the second manifold 24. The first blower then impels the air from the second manifold through the air conditioning portion 14 and the door 42. The force of the impelled air acts against the force of the torsion spring 96 of the throttle and check valve 28 to open the flapper 48. The degree of flapper opening is regulated by the yoke 94 impinging upon the spherical stop 76. About 60% of the air passes through the door and the port 44 to pressurize the enclosed environment 16 and 40% of the air passes through the air conditioning portion 14 to condition the environment. The environment is pressurized above ambient pressure to ensure that any leakage passes out of the environment thereby protecting the inhabitants therein The air passes through the cooling coils 38 which provide cooling to the air when the ambient temperature is above about 50° F. The heating coils 40 heat the air passing thereby when the ambient temperature is below about 50° F. The heating coils and the air cooler 36 are controlled by a conventional controller (not shown).

In environments below 30° F., the thermoactuator 70 and the stop 76 do not allow the flapper 48 to open beyond 7½ thereby restricting the amount of air passing through the system. As such, the ability of the heating coils 40 to raise the temperature of the air passing through the conduit 34 is not exceeded. Above 50° F., the thermoactuator pushes the piston 74 and the stop to the left. The first blower 26 may then bias the door open to about 26° at which point the maximum amount of air can flow through the system for cooling. Between 30° F. and 50° F. the piston moves to the left such that the flapper may open in a roughly linear manner from between 7½ and 26°. Should the temperature drop, the biasing spring 78 pushes the stop and the piston to the right thereby reloading the piston. Because the stop only limits the degree the flapper may pivot against the action of the air impelled by the blower, the throttle and check valve is always free to close when the blower is stopped. The torsion spring 96 always urges the flapper against the raised portion 52 of the housing 46. When the second blower 30 is activated (i.e. the first blower is inactivated), the torsion spring closes the flapper, and air for breathing is provided through the conduit 34 to the enclosed environment. The door 42 is biassed closed by a controller (not shown) when the second blower is activated so that all the air provided by the second blower is directed to the vehicle inhabitants.

By providing the thermostatic throttle and check valve 28 within the system, a simple reliable system is provided that operates at all temperatures without the use of complex electrical control systems, servos or sensors. By limiting air flow at lower temperatures the heating capacity of the system is not exceeded. By opening flow at higher temperatures, the proper amount of cooling air may be provided to the system.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. An environmental control system for supplying conditioned, filtered and pressurized air to an enclosed environment at a given temperature, the system comprising:
    a constant speed blower for pressurizing and supplying the air, said blower having an air outlet,
    a cooling means for lowering the temperature of the air passing from said air outlet to said environment,
    a heating means for raising the temperature of the air passing from said air outlet to said environment, and
    a thermostatic control valve mounted upon said air outlet, said valve opening a minimum degree to limit the amount of air supplied from said blower to said environment when the temperature of ambient air falls below a maximum parameter, said valve opening a maximum degree when the temperature of the ambient air exceeds a maximum parameter, and said valve opening in a roughly linear degree between said lower parameter and said upper parameter, such that the system is able to heat said air passing from said air outlet to said environment to said given temperature when said temperature of said ambient air is below said minimum parameter and the system is able to cool the air passing from said air outlet to said environment to said given temperature when said temperature of said ambient air is above said maximum parameter.

2. The system of claim 1 wherein said control valve is further characterized by:
    means for biassing said valve to a closed position.

3. The system of claim 1 wherein said control valve is further characterized by:
    a flapper for controlling the air output from said blower,
    a self-contained actuator means for providing a stop as a function of air temperature, and
    means for connecting said flapper to said actuator means such that said flapper abuts said stop upon actuation of said blower and such that said flapper may close against said air outlet upon inactivation of said blower.

4. The system of claim 3 wherein said control valve is further characterized by:

means for biassing said flapper to a closed position against said air outlet.

5. The system of claim 3 wherein said actuator means is further characterized by:
   a thermal actuator (a stop attaching to said actuator, said stop being biassed in a first direction by said actuator as temperature increases, and
   means for biassing said stop in a second direction as said temperature decreases.

6. The system of claim 3 wherein said means for connecting is characterized by:
   an arm having a first end attaching to said flapper and having a second end forming a yoke disposed upon said actuator means.

7. An environmental control system for supplying conditioned, filtered and pressurized air to an enclosed environment at a given temperature, the system comprising:
   a constant speed blower for pressurizing and supplying the air, said blower having an air outlet,
   a cooling means for lowering the temperature of the air passing from said air outlet to said environment,
   a heating means for raising the temperature of the air passing from said air outlet to said environment, and
   a thermostatic control valve mounted upon said air outlet, said valve opening a minimum degree to limit the amount of air supplied from said blower to said environment when the temperature of ambient air falls below a minimum parameter, said valve opening a maximum degree when the temperature of the ambient air exceeds a maximum parameter, and said valve opening in a roughly linear degree between said lower parameter and said upper parameter, such that the system is able to heat said air passing from said air outlet to said environment to said given temperature when said temperature of said ambient air is below said minimum parameter and the system is able to cool the air passing from said air outlet to said environment to said given temperature when said temperature of said ambient air is above said maximum parameter.

8. The system of claim 7 wherein said control valve is further characterized by:
   means for biassing said valve to a closed position.

9. The system of claim 7 wherein said control valve is further characterized by:
   a flapper for controlling the air output from said blower,
   a self-contained actuator means for providing a stop as a function of air temperature, and
   means for connecting said flapper to said actuator means such that said flapper abuts said stop upon actuation of said blower and such that said flapper may close against said air outlet upon inactivation of said blower.

10. The system of claim 9 wherein said control valve is further characterized by:
    means for biassing said flapper to a closed position against said air outlet.

11. The system of claim 9 wherein said actuator means is further characterized by:
    a thermal actuator,
    a stop attaching to said actuator, said stop being biassed in a first direction by said actuator as temperature increases, and
    means for biassing said stop in a second direction as said temperature decreases.

12. The system of claim 9 wherein said means for connecting is characterized by:
    an arm having a first end attaching to said flapper and having a second end forming a yoke disposed upon said actuator means.

13. An environmental control system for supplying conditioned, filtered and pressurized air to an enclosed environment at a given temperature, the system comprising:
    a constant speed blower for pressurizing and supplying the air, said blower having an air outlet,
    a cooling means for lowering the temperature of the air passing from said air outlet to said environment,
    a heating means for raising the temperature of the air passing from said air outlet to said environment, and
    a thermostatic control valve mounted upon said air outlet, said valve opening a minimum degree to limit the amount of air supplied from said blower to said environment when the temperature of the ambient air falls below a minimum parameter, said valve opening a maximum degree when the temperature of the ambient air exceeds a maximum parameter, and said valve opening in a roughly linear degree between said lower parameter and said upper parameter.

14. The system of claim 13 wherein said control valve is further characterized by:
    means for biassing said valve to a closed position.

15. The system of claim 13 wherein said control valve is further characterized by:
    a flapper for controlling the air output from said blower,
    a self-contained actuator means for providing a stop as a function of air temperature, and
    means for connecting said flapper to said actuator means such that said flapper abuts said stop upon actuation of said blower and such that said flapper may close against said air outlet upon inactivation of said blower.

16. The system of claim 15 wherein said control valve is further characterized by:
    means for biassing said flapper to a closed position against said air outlet.

17. The system of claim 15 wherein said actuator means is further characterized by:
    a thermal actuator,
    a stop attaching to said actuator, said stop being biassed in a first direction by said actuator as temperature increases, and
    means for biassing said stop in a second direction as said temperature decreases.

18. The system of claim 15 wherein said means for connecting is characterized by:
    an arm having a first end attaching to said flapper and having a second end forming a yoke disposed upon said actuator means.

19. An environmental control system for supplying conditioned, filtered and pressurized air to an enclosed environment at a given temperature, the system comprising:
    a constant speed blower for pressurizing and supplying the air, said blower having an air outlet,
    a cooling means for lowering the temperature of the air passing from said air outlet to said environment,
    a heating means for raising the temperature of the air passing from said air outlet to said environment, and a thermostatic control valve mounted upon said air outlet of said blower, said valve opening a minimum degree to limit the amount of air supplied from said blower to said environment when the temperature of the ambient air falls below a minimum parameter, and said valve opening a maximum degree when the temperature of the ambient air exceeds a maximum parameter.

20. The system of claim 19 wherein said control valve is further characterized by:
    means for biassing said valve to a closed position.

21. The system of claim 19 wherein said control valve is further characterized by:
    a flapper for controlling the air output from said blower,
    a self-contained actuator means for providing a stop as a function of air temperature, and
    means for connecting said flapper to said actuator means such that said flapper abuts said stop upon actuation of said blower and such that said flapper may close against said air outlet upon inactivation of said blower.

22. The system of claim 21 wherein said control valve is further characterized by:
    means for biassing said flapper to a closed position against said air outlet.

23. The system of claim 21 wherein said actuator means is further characterized by:
    a thermal actuator,
    a stop attaching to said actuator, said stop being biassed in a first direction by said actuator as temperature increases, and
    means for biassing said stop in a second direction as said temperature decreases.

24. The system of claim 21 wherein said means for connecting is characterized by:
    an arm having a first end attaching to said flapper and having a second end forming a yoke disposed upon said actuator means.

* * * * *

UNITED STATES PATENT AND TRADEMARK OFFICE
CERTIFICATE OF CORRECTION

PATENT NO. : 4,852,637

DATED : August 1, 1989

INVENTOR(S) : Gordon R. Grubert and Douglas L. Christians

It is certified that error appears in the above-identified patent and that said Letters Patent is hereby corrected as shown below:

Column 5, line 5 "actuator (" should read
   --actuator;--

Delete "a stop attaching to said actuator, said stop being biassed in a first direction by said actuator as termperature increases, and
   means for biassing said stop in a second direction as said temperature decreases."

Insert new paragraph after "actuator;"
   --a stop attaching to said actuator, said stop being biassed in a first direction by said actuator as temperature increases, and
      means for biassing said stop in a second direction as said temperature decreases.--

Signed and Sealed this

Nineteenth Day of June, 1990

Attest:

HARRY F. MANBECK, JR.

Attesting Officer

Commissioner of Patents and Trademarks